Sept. 27, 1960 F. MINECK 2,953,857
WHEEL ALIGNMENT TESTING MACHINE
Filed May 26, 1959 3 Sheets-Sheet 3
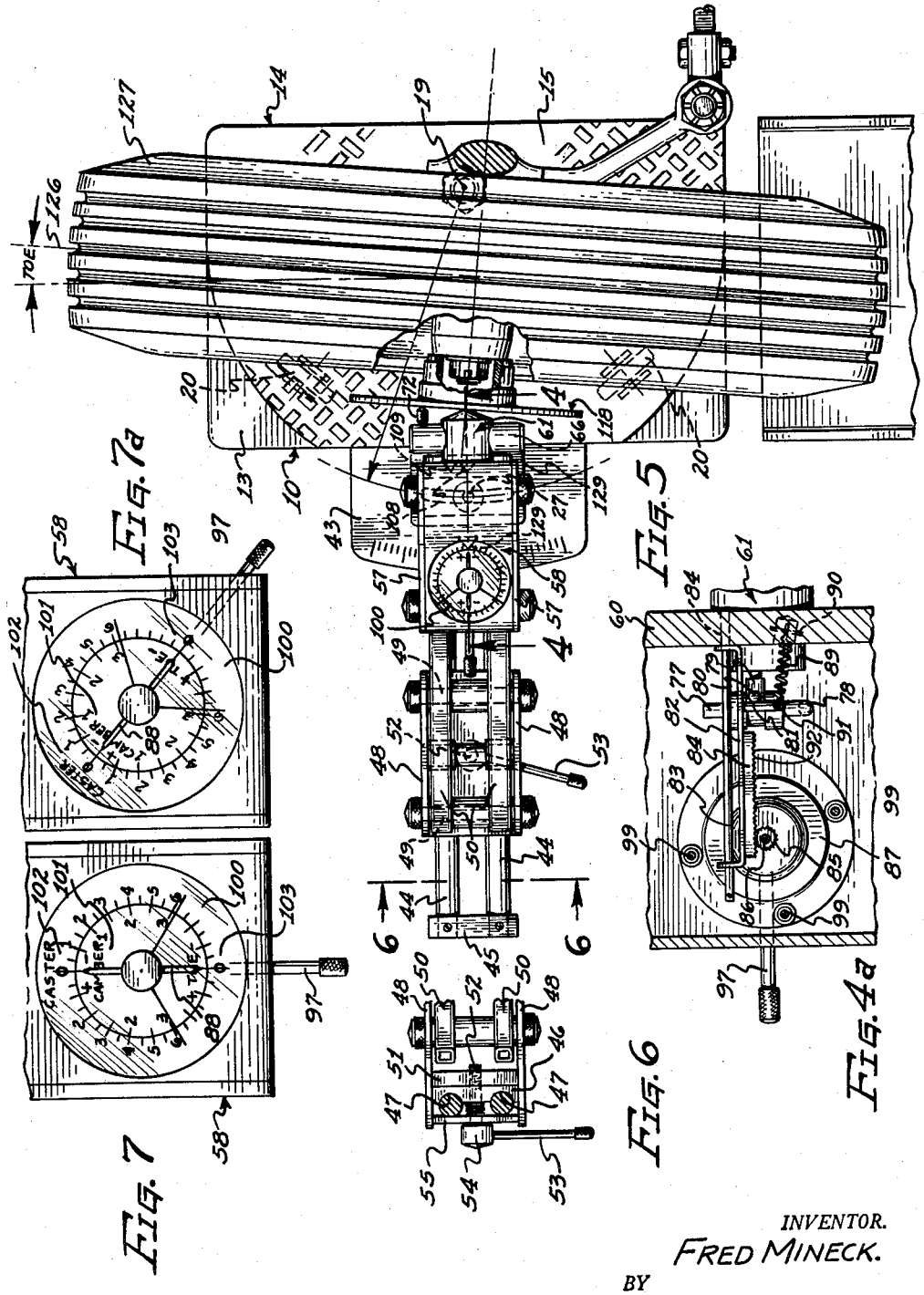
INVENTOR.
FRED MINECK.
BY
Willard S. Grame
ATTORNEY.

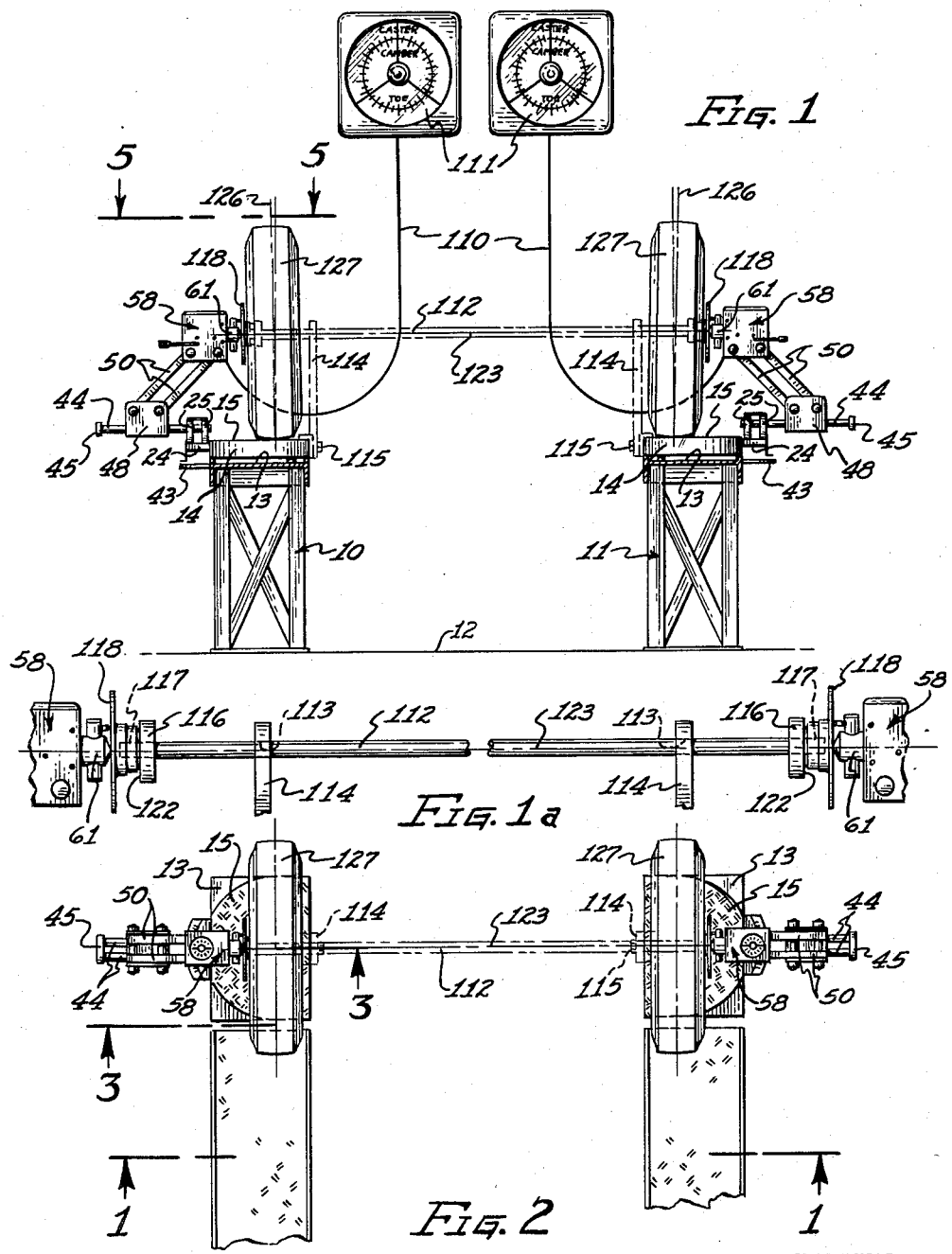

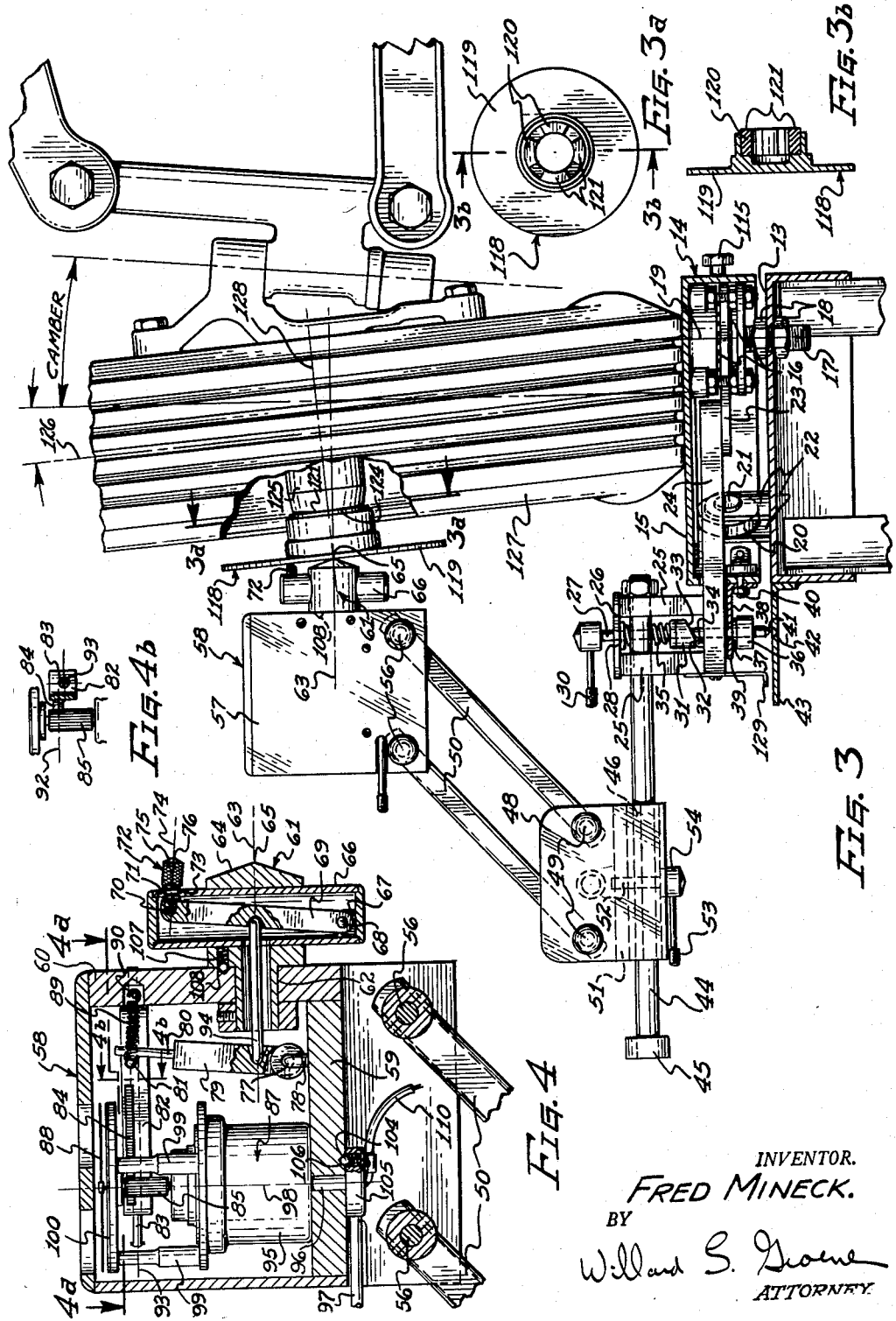

United States Patent Office 2,953,857
Patented Sept. 27, 1960

2,953,857
WHEEL ALIGNMENT TESTING MACHINE
Fred Mineck, 2643 E. Adams, Phoenix, Ariz.
Filed May 26, 1959, Ser. No. 815,983
5 Claims. (Cl. 33—203.12)

This invention pertains to improvements in wheel alignment testing machines and is particularly directed to such a machine for testing the caster, camber and toe for front wheel assemblies of motor vehicles.

One of the objects of this invention is to provide a wheel alignment testing machine of simple and rugged construction and which is universally applicable to any type of front end system for motor vehicles.

Another object of this invention is to provide a wheel alignment system which utilizes a basic test bar for precise setting of the indicating devices prior to making the actual tests of caster, camber and toe on the motor vehicle front end system.

A further object of this invention is to provide a wheel alignment test machine which utilizes a magnetically held disc which is applicable first to a basic test bar and then to the outer face of the wheel hub for check wheel alignment requiring only the removal of the wheel disc and grease cap of the front wheel hub.

A still further object of this invention is to provide a wheel alignment testing machine in which a reference plane disc attached to the wheel hub, independent of the axis of rotation of the wheel and the center hole in the end of the wheel spindle, provides the sole means for indicating the alignment condition of camber, caster and toe of the front end assembly.

And it is also an object of this invention to provide in a wheel alignment testing machine with a sensing element having a disc contacting anvil and a sensing stylus located at a precise fixed radial distance therefrom as the sole means for detecting the wheel alignment of the front end suspension of a motor vehicle.

Further features and advantages of this invention will appear from a detailed description of the drawings in which:

Fig. 1 is an elevational view partly in section on line 1—1 of Fig. 2, looking forwardly of the motor vehicle being tested, of a wheel alignment testing machine incorporating the features of this invention.

Fig. 1a is an enlarged fragmentary view of the basic test bar shown in broken section line in Fig. 1.

Fig. 2 is a plan view of the apparatus shown in Fig. 1.

Fig. 3 is an enlarged view partly in section on the line 3—3 of Fig. 2.

Fig. 3a is a view of the magnetic checking disc on the line 3a—3a of Fig. 3.

Fig. 3b is a sectional view on the line 3b—3b of Fig. 3a.

Fig. 4 is an enlarged sectional view on the line 4—4 of Fig. 5.

Fig. 4a is an enlarged fragmentary sectional view on the line 4a—4a of Fig. 4.

Fig. 4b is an enlarged fragmentary view on the line 4b—4b of Fig. 4.

Fig. 5 is an enlarged plan view partly broken away of the apparatus shown in Fig. 3.

Fig. 6 is a sectional view on the line 6—6 of Fig. 5.

Fig. 7 is a view of the indicating dial utilized to indicate caster and camber.

Fig. 7a shows the dial of Fig. 7 utilized to indicate toe.

As an example of one embodiment of this invention, there is shown a wheel alignment testing machine comprising a pair of frames 10 and 11 suitably fixed to the floor 12 and fixed to the top of each frame are the top plates 13. Since the units for each wheel are the same, a description of one will suffice. A swivel plate 14 having a horizontal tire tread engaging surface 15 is mounted to swing about a vertical axis 19 on a suitable anti-friction bearing 16 carried by the stud 17 fixed by the nuts 18 to the top plate 13. Further radially positioned thrust rollers 20 journaled on pins 21 carried in the brackets 22 fixed to the top plate 13 give added support for the swivel plate 14 in carrying the weight of the motor vehicle.

Fixed to the spacer plate 23 located between the two sets of ball bearings 16 and rocking about the axis 19 is the arm 24, to the outer end of which are fixed the radially spaced support blocks 25 tied together by the top plate 26. A rockable and axially slidable shaft 27 is journaled in a suitable bearing 28 in the top plate 26 and in a suitable bearing 29 in the arm 24. Fixed to the shaft 27 is the operating handle 30 for manually rotating the shaft 27. A cam 31 is fixed to the shaft 27 and has a land surface 32 and a beveled drop surface 33 adapted to engage a cam pin 34 fixed in the arm 24. A suitable compression spring 35 acting between the plate 26 and the cam 31 serves to normally move the shaft 27 downwardly and cam surfaces 32 and 33 in contact with the cam pin 34. On the lower end of the shaft 27 is fixed the clamp collar 36 above which is carried a rubber friction washer 37 adapted to be engaged with the underside 38 of the clamp plate 39 fixed by suitable bolts 40 to the swivel plate 14 when the handle 30 is moved to bring cam land 32 up on the pin 34, thus locking arm 24 to the swivel plate 14. When handle 30 is moved to bring the portion 33 in engagement with the pin 34, the pointed end 41 of the lower end of the shaft 27 engages in the mating detent 42 in the angle indicating plate 43 which is rigidly fixed to the top plate 13, so that under these conditions the arm 24 is locked to the frames 10 and 11 while the swivel plate is free to rock about the axis 19.

A pair of spaced horizontal guide bars 44 are suitably fixed in the support blocks 25 and are tied together at their outer ends by a suitable tie block 45. A slide block 46 has arcuate bearing surfaces 47 slidable on the bars 44 to which are fixed the side plates 48 carrying the pivot pins 49 upon which the lower ends of the parallel arms 50 are mounted. A clamp plate 51 above the slide block 46 threadedly receives the clamping screw 52. An operating handle 53 having a hub 54 engaging the backup plate 55 provides means for tightening the screw 52 to clamp the assembly 46—48 at desired positions on the bars 44.

Pivotally mounted on pins 56 on the upper ends of the parallel arms 50 are the side plates 57 of the sensing box 58 having the bottom 59 and front 60 fixed to the side plates 57. An anvil member 61 is journaled against axial movement in the bearing bore 62 in the front 60 of the sensing box 58 for rotation about the axis 63, the anvil having a conical surface 64 terminating in a point 65 lying on the axis 63. A diametrically disposed tubular member 66 is fixed in the anvil member 61 and has a boss 67 carrying a pin 68 on which one end of the pivot arm 69 is mounted. Fixed in the other end of the arm 69 is the sensing stylus stud 70 extending outwardly through the clearance hole 71 formed in the tubular member 66. An axially adjustable sensing stylus 72 is threadedly mounted on the stud 70 for axial adjustment on the axis 74, and a compression spring 73 surrounding the stud 70 interacting between the pivot arm 69 and the inner face of the end of the sensing stylus 72 serves to hold said stylus in adjusted positions. The sensing stylus has a conical surface 75 terminating in a point 76 lying on the axis 74 of the sensing stylus 72. It is important to note that the distance between the point 65 of the anvil member 61 and the point 76 of the sensing stylus remains substantially constant and any minor variations of this distance have no affect during all measuring and checking operations during the use of the device. By appropriately positioning the clamp unit 46–48 on the bars 44 the desired position of contact of the point 65 of the anvil 61 and the point 76 of the sensing stylus 72 on the surface 119 of the checking disc 118 can be obtained. The parallel arm arrangement described allows the anvil point 65 to rest against the surface 119 by gravity while at the same time allowing the unit 58 to be moved back out of the way for placement and removal of the test bar on the vehicle to be tested in the device.

Suitably pivotally mounted on a pin 77 on a bracket 78 fixed to the bottom 59 is the actuating arm 79 having an actuating pin 80 engaging a stud 81 fixed in the rack yoke 82 axially slidable and rockable on the rod 83 fixed in the bore 84 in the front member 60. A rack 84 is fixed on the yoke 82 and engages the pinion 85 fixed on the shaft 86 of the armature or rotor of a Selsyn transmitter 87 and to the upper end of the shaft 86 is fixed the double indicating pointer 88. A tension spring 89 is connected to the outer end of the stud 81 and at its other end to a pin 90 fixed in the front member 60. It will be noted that the point of connection 91 lies substantially upon the center or pitch line 92 of the teeth of the rack 84 which in turn is above the axis 93 of rod 83 so that the spring serves both to hold the actuating arm biased in a clockwise direction, Fig. 4, and also to keep the yoke 82 and rack 84 swung into back lash free engagement with the pinion 85 at all times. A suitable push rod 94 interconnects the actuating arm 79 with the pivot arm 69 to normally yieldingly urge the sensing stylus outwardly of the tubular member 66 and anvil member 61.

The stator body 95 of the selsyn transmitter 87 is pivotally mounted on the bottom 59 on the adjusting shaft 96 to which is fixed the adjusting handle 97 for rocking the stator 95 about the axis 98 which is also the axis of swinging of the pointer 88. Fixed to the top of suitable upright supports 99, in turn fixed at their lower ends to the stator body 95, is the indicating dial 100 showing the number of degrees, plus or minus, of camber 101, caster 102 and toe 103. A suitable spring ball detent 104 carried in the hub 105 of the adjusting handle 97 engaging a detent cavity 106 in the bottom 59 serves to position the handle 97 and selsyn stator body in zero position. A further spring ball detent 107 carried in the anvil member 61, Fig. 4, engages 90° circumferentially disposed detent cavities 108 and 109 to respectively position the anvil member 61 and sensing stylus 72 about the axis 63 in camber and caster checking position, Fig. 3, and toe position, Fig. 5.

The dials 100 and indicating pointers 88 may be electrically connected through the usual wiring 110 to selsyn receivers in the enlarged duplicate dials 111 remotely located for easy reading for the operator of the device or an occupant of the vehicle.

A basic test bar 112 is provided to initially set all functions of the machine to zero prior to actually checking a motor vehicle. This bar is supported in suitable bores 113 in upright standards 114 fixed by suitable bolt 115 to the swivel plates 14 of the device. Steel hubs 116 are fixed to each end of the test bar 112 having suitable guide bushing portions 117 arranged to receive the checking discs 118. Each of these discs, Figs. 3a and 3b, have a flat reference surface 119 and a series of suitable gripping magnets 120 having work contacting surfaces 121 lying in a plane parallel to the reference surface 119 thereof. These discs 118 may be placed over the ends of the test bar 112 with its magnet faces 121 gripping the faces 122 of the steel hubs 116 to secure the disc on the test bar with their reference surfaces 119 parallel and at right angles to the axis 123 of the test bar 112. The checking discs are also adapted to be mounted in the same way on the end face 124 of the wheel hub 125 of the motor vehicle so as to provide a reference surface 119 parallel to the center line 126 of the tire 127 and at right angles to the wheel spindle axis 128, the surface 121 of the magnets firmly and accurately gripping the surface 124 of the wheel hub 125.

In the operation of the machine, the basic test bar 112 is placed in position on the upright standards as described, Figs. 1 and 1a, and the checking discs mounted on each end thereof. Each checking head or sensing box is then moved into the position shown in Figs. 1, 2 and 3, with the point 65 of the anvil member 61 by appropriately positioning the member 46—58 and clamping it to the bars 44 by manipulating the operating handle 53. It is important to note that it is not critical as to the point 65 engaging the center of the disc 118 or that it be on the axis 123 of the test bar 112. Anywhere within the disc face 119 is satisfactory just so long as the sensing stylus point 76 remains in contact with the surface 119. The tubular member or turret 66 is then swung to horizontal position as shown in Fig. 5 with ball detent 107 engaging detent cavity 109. Adjusting handle 97 is positioned at zero with ball detent 104 engaging detent cavity 106. The sensing stylus 72 is then adjusted axially while its point is in contact with surface 119 until pointer 88 registers with zero on dial 100. The turret 66 is then revolved through 360° with points 65 and 76 in contact with the surface 119 of the discs 118 on the test bar 112, and if the pointer 88 remains on zero the machine has now been adjusted to check wheel alignment on an actual vehicle front end. The test bar 112 is now removed from the machine and the checking discs 118 mounted on the wheel hub surfaces 124 as described.

To check camber the turret 66 set in vertical position as shown in Fig. 3, with ball detent 107 engaging detent cavity 108. Operating handle 30 is positioned to lock the swivel plate or turntable 14 rigidly to the arm 24 carrying the sensing box 58. At this time lever 97 is in zero position with detent 104 in detent cavity 106. The deviation, plus or minus, of pointer 88 from zero in the camber portion 101 of dial 100 is the indication of the camber condition.

With the parts adjusted as above, caster is read by turning the vehicle wheels 127 and with them the swivel plates 20 degrees forward, toward the inside of the vehicle, for each wheel, then adjust the lever 97 until the dial reads zero under the pointer 88. The vehicle wheels are then turned 20 degrees in the opposite direction or 40 degrees back from the zero setting and the caster reading then taken on scale 102 of the dial 100. A degree indicating pointer 129 fixed to the arm 24 shows the degrees of wheel swing in conjunction with the indications 130 on the plate 43. At the completion of caster reading the lever 97 is returned to zero detent engaged position 104—106.

Toe is read by manipulating lever 30 to release arm 24 from the turntable 14 and to lock the arm 24 through the detent 42 to the frame of the machine. The tubular member 66 is turned to horizontal forward position as shown in Fig. 5 with ball detent 107 engaging detent cavity 109 the pointer 88 moving from zero position to indicate toe on portion 103 of the dial 100.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. In a wheel alignment testing machine, a frame, a tire engaging swivel plate pivotally mounted for swinging in a horizontal plane on said frame, a wheel carrying said tire and a wheel hub for said wheel, a sensing box, a swinging arm pivotally mounted to rock about a vertical axis on said frame, a checking disc adapted to be secured to said wheel hub having a reference surface defining a plane parallel to the centerline plane of said tire and at right angles to the axis of rotation of said wheel hub and tire, an anvil on said sensing box having a point fixed relative thereto adapted to engage said reference surface of said checking disc, a sensing stylus yieldingly movable relative to said sensing box having a point adapted to engage said checking disc reference surface, a clamping device on said swinging arm operable to one position to lock said swinging arm to said swivel plate and operable to another position to release said arm from said swivel plate and to lock said arm to said frame, a dial fixed to said sensing box, and a pointer movable on said sensing box relative to said dial operable by the movement of said sensing stylus.

2. In a wheel alignment testing machine as set forth in claim 1 wherein the contact point of said sensing stylus is located at a fixed radially disposed position from the contact point of said anvil.

3. In a wheel alignment testing machine as set forth in claim 1 wherein said sensing stylus is movably mounted on said sensing box so that the sensing stylus point may be revolved about the contact point of said anvil while both of said contact points are in contact with the reference surface of said checking disc.

4. In a wheel alignment testing machine having a frame, a wheel supporting turntable pivotally supported on said frame for rocking about a vertical axis thereon, a swinging arm pivotally mounted on said frame to swing about said mentioned vertical axis independent of said turntable, a clamp device on said swinging arm including a manipulating handle operable to one position to lock said swinging arm to said turntable for unitary swinging of said arm and turntable and said handle operable to another position to release said arm from said table and to lock said arm against movement to said frame, a sensing box, a device for adjustably clamping said sensing box on said swinging arm including horizontal radially disposed guide bars fixed to said swinging arm, a member adjustably clampable on said bars, and parallel arms pivotally interconnecting said sensing box to said adjustable member for parallelogram movement of said sensing box in a vertical plane on said swinging arm, a checking disc adapted to be mounted on the wheel hub of the motor vehicle being tested having a reference surface defining a plane at right angles to the axis of rotation of said wheel hub, a horizontally disposed anvil member in said sensing box having a contact point engaging said disc reference surface to arrest said parallelogram movement of said sensing box toward said checking disc, a horizontally movable stylus in said sensing box having a contact point yieldingly engaging said reference surface at a predetermined fixed radial distance from the point of disc surface engagement of said anvil, an indicating dial on said sensing box, and a pointer on said box movable relative to said dial connected to be actuated by said sensing stylus.

5. In a wheel alignment testing machine as set forth in claim 4 wherein there is provided a selsyn transmitter having stator body rotatably mounted in said sensing box, a manipulating handle on said box for rocking said stator body to and from a zero detent position on said sensing box, said indicating pointer being connected to the armature of said selsyn transmitter so that actuation of said sensing stylus simultaneously actuates said pointer and selsyn transmitter armature, and a remote dial including a selsyn receiver electrically connected to said selsyn transmitter having an indicating pointer fixed to the armature of said selsyn receiver.

No references cited.